United States Patent [19]

Roberts et al.

[11] 3,925,300
[45] Dec. 9, 1975

[54] MOLDING COMPOUNDS AND METHOD OF MAKING SAME

[75] Inventors: Michael G. Roberts, Heath; Kenneth P. Chase, Newark, both of Ohio

[73] Assignee: Owens-Corning Fiberglas Corporation, Toledo, Ohio

[22] Filed: Apr. 4, 1974

[21] Appl. No.: 457,948

[52] U.S. Cl. ............................ 260/40 R; 260/862
[51] Int. Cl.$^2$ ................ C08K 7/14; C08L 67/06
[58] Field of Search ............... 260/40 R, 862, 886

[56] References Cited
UNITED STATES PATENTS

| | | | |
|---|---|---|---|
| 3,389,192 | 6/1968 | Ziegler | 260/862 |
| 3,391,222 | 7/1968 | Robitschek | 260/862 |
| 3,503,921 | 3/1970 | Souza, Jr. et al. | 260/862 X |

FOREIGN PATENTS OR APPLICATIONS

| | | | |
|---|---|---|---|
| 870,191 | 6/1961 | United Kingdom | 260/89.5 A |

Primary Examiner—Lewis T. Jacobs
Attorney, Agent, or Firm—Carl G. Staelin; John W. Overman; William P. Hickey

[57] ABSTRACT

An improved method of producing a molding composition comprising a polyester resin prepolymer, a generally immiscible thermoplastic resin and a mutual monomeric solvent for both resins which will crosslink the polyester. The improvement is had by mixing thermoplastic polymer while still dispersed in the monomer from which is was polymerized with the thermosetting prepolymer. During crosslinking of the thermosetting prepolymer the immiscible thermoplastic resin separates out in major separated phase bodies having but a small amount of a secondary separated phase therein. A sizable percentage of major separated phase bodies have voids therein believed to be produced by vaporized pockets of unreacted monomer, and the major separated phase bodies have a more diffused interface with the matrix than the prior art materials. The diffused interface is believed produced at least in part by reason of the improved affinity which the thermoplastic molecules have for the polyester. The thermoplastic molecules are of a narrow band of intermediate molecular weight so that they all leave the polyester at about the same time and carry a sizable amount of monomer with them into the separated phase.

20 Claims, 4 Drawing Figures

MOLDING COMPOUNDS AND METHOD OF MAKING SAME

BACKGROUND OF THE INVENTION

The present invention relates to new and improved sheet molding compounds and/or bulk molding compounds, particularly of the polyester type, which do not shrink appreciably during cure or crosslinking of the thermosetting resin prepolymer, and which have greater strength, less water absorption, better efficiency of pigmentation and other physical properties than do prior art materials.

Thermosetting resin prepolymers which crosslink during their cure to the thermoset condition invariably shrink during the crosslinking, and this is particularly true of unsaturated polyester resins which crosslink by the condensation with unsaturated solvents. When such materials are mixed with glass fibers and cured in a mold, the resin between the fibers shrinks during cure leaving the imprint of the fibers on the surface of the part produced. Over a decade ago it was discovered that if a solution of a thermoplastic resin were mixed with the thermosetting prepolymer prior to cure, the particles of the thermoplastic resin would separate out, and thus volumetrically decrease the amount of the total shrink of the cured part. Patents can be found teaching substantially every known type of thermoplastic polymer additive to polyester resins. Some of these polymers are more compatible with the polyester prepolymer when combined with a monomer than are others, but all of the systems suggested will undergo a shrinkage of the polyester prepolymer while it is crosslinking. The thermoplastics suggested for combination with the polyester prepolymers interfere with the strength, pigmentation, and other properties of the final product, and many will bleed over the surfaces of the heated molds in which the final products are formed, such that the surfaces of the molds must be cleaned repeatedly.

An object of the present invention is the provision of a new and improved low shrink thermosetting molding material which produces a more diffuse interface between the separated thermoplastic phase and the thermoset matrix than do prior art materials.

A further object of the present invention is the provision of a new and improved low shrink thermosetting molding compound of the above described type whose pigmentable characteristics are considerably improved over the prior art materials.

A still further object is the provision of low shrink molding materials of the above-described type which produce a large void in the center of the separated thermoplastic phase bodies to further decrease the shrink during cure of the materials.

Further objects and advantages of the invention will become apparent to those skilled in the art to which the invention relates from the following description of several preferred embodiments described with reference to the drawings which form a part of the present specification.

DESCRIPTION OF THE PREFERRED EMBODIMENTS

Figure 1:
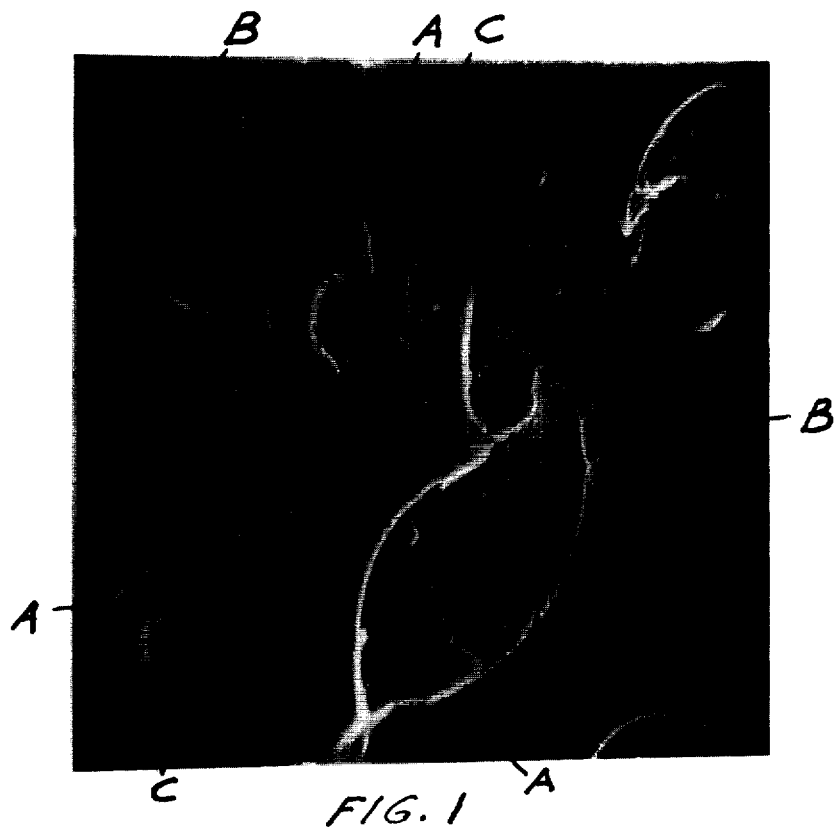
FIG. 1 is a photomicrograph of a material embodying principles of the present invention, and which was made by an electron microscope at a magnification of 450.

According to the present invention a low shrink molding compound is produced of a thermosetting resin prepolymer and a thermoplastic resin which during cure separates to provide a thermoplastic phase whose interface with the thermoset phase is diffused by reason of more pronounced bonding therebetween than has been produced heretofore. This bonding between the two major phases produces cured materials having less water absorption, better pigmentability, and dispersion of filler than has been produced heretofore.

The precise mechanism by which all this is obtained is not fully known, but an understanding of how it is obtained and its true significance will be had from the following description of the preferred embodiments as compared with the prior art as exemplified by the material of the Kroekel U.S. Pat. No. 3,701,748.

EXAMPLE 1

A thermoplastic additive material for low shrink thermosetting polyester molding compound was prepared according to the present invention using the following procedure.

A reactor that was equipped with an agitator, a nitrogen sparge and an internal cooling coil was charged with 7,410 parts of styrene, 90 parts of acrylic acid, and 15 parts of benzoyl peroxide. After 30 minutes of sparging with nitrogen, the temperature was raised to 70°C and was held at this temperature until a slight exotherm began. After the exotherm began, a flow of cooling water was passed through the cooling coil to maintain the temperature at 70°C plus or minus 0.5°C. The reaction was allowed to continue until the solids reached 40% by weight. At this time 3 parts of an inhibitor (toluhydroquinone) was added to short stop the reaction and the batch was discharged. A final solids check was made of the batch and enough styrene was added to produce a syrup of the thermoplastic containing 33.3% solids. The polystyrene so produced had a dispersity of 2.8, and an average molecular weight of 240,000. The syrup had no perceptible nonreactive monomer or emulsifiers and had only 0.05 percent by weight of water. The polystyrene also had a number average molecular weight of 150,000 and a peak molecular weight of 270,000.

A polyester was made in another reactor from the following materials in parts by weight:

| Materials | Parts By Weight |
|---|---|
| Propylene glycol | 578.2 |
| Maleic anhydride | 674.4 |
| Toluhydroquinone (25% solution in styrene) | 4.8 |

The polyester was made by charging all the propylene glycol, one third of the maleic anhydride and 1.6 grams of toluhydroquinone into the reactor using a continuous nitrogen sparge. The temperature was raised to 190°F and after about 4 hours, the acid number was 35. Thereafter the remainder of the maleic anhydride was added at the rate of 100 to 150 parts per minute to control the temperature at 300°F. Thereafter the temperature of the ingredients was held at 310 to 320°F for 60 minutes, following which the temperature was increased to 400°F. The material had an acid number of 29 to 32 and a sample cut 2 to 1 in styrene had a Saybold viscosity of 21 to 25 seconds at 350°F. Thereafter the contents were cooled to 340°F. The polyester prepolymer when cut with styrene in a 90 to 10 ratio was stable at 120°C for 30 minutes before gelling.

In another tank 486.4 parts of styrene, 2.0 parts of MEHQ (methyl ether of hydroquinone) is added and the mixture held at a temperature between 130° to 145°F. Thereafter 1,138 parts of the polyester resin prepolymer produced as above described and at a temperature of 330° to 355°F was added with agitation to provide a thinned polyester syrup which was then cooled to a temperature of 180°F. The viscosity of the thinned polyester syrup was 1,500 to 2,000 Brookfield cps and had a water content of 0.08 and a monomer content within the range of 30 to 34% by weight.

A matrix resin mix was made from the following ingredients:

| | |
|---|---|
| Polyester resin syrup made as above described | 1200 |
| Thermoplastic polymer syrup made as above described | 800 |
| Tertiary Butyl Perbenzoate | 13.2 |
| Benzoyl Peroxide | 6.0 |
| Zinc Stearate | 80.0 |

The resin mix was produced by charging the polyester resin to a Cowles mixer, and thereafter slowly adding the other ingredients while the mixer was running to thoroughly disperse the ingredients throughout the resin.

A Molding Premix was made from the following ingredients:

| | |
|---|---|
| Above resin mix | 1763.0 |
| Calcium carbonate filler | 315.0 |
| Clay filler | 2832.0 |
| One quarter inch chopped glass fibers produced according to Example 1 of Ward Patent 3,702,276 | 1080.0 |

The Molding Premix was made by adding the resin mix to a Baker-Perkins single blade type mixer, followed by the clay and calcium carbonate filler while the mixer was running. After the above ingredients were dispersed into the resin, the mixer was run for an additional two minutes to assure a uniform dispersion. Thereafter the ¼ inch chopped glass fibers were blended in, and the mixer was run for an additional 1 minute period to assure a uniform dispersion of the strand throughout the other ingredients. The Molding Premix produced as above described has approximately 18% glass by weight.

A test specimen is made by weighing out a sufficient amount of the premix to fill a flat bottom mold to a depth of 0.100 inch and bringing a cover die down upon the resin with sufficient force to provide a loading of 2,000 pounds per square inch on the resin. The premix was cured under this compression for 3 minutes at a temperature of 280° to 300°F, following which the molded sheet was removed and cooled. The surface of the molded article was smooth with no evidence of fiber imprint, and had a dark grey color. A test specimen approximately ½ inch wide and 2½ inch long was cut from the material and the test specimen was notched, all in accordance with the procedure set forth in ASTM test specification D256. The test specimen was placed on an Izod impact strength testing machine, and the weighted pendulum was allowed to strike the cantilevered end of the specimen. The test specimen has an impact strength of between 8.0 and 10.0 foot pounds per inch of width.

By way of control, and not according to the invention, the process above described was repeated excepting that the thermoplastic polystyrene resin used was not bulk polymerized to low conversion. The polystyrene used was made using the same proportion of monomers given above excepting that the polymerization was carried out to nearly 100% conversion. The polystyrene had an average molecular weight of 600,000 and a dispersity of 4.5. The solid resin was dissolved in styrene to give a syrup having 33.3% solids. This syrup was then combined with the polyester syrup and a molding compound made using the procedure above described. The test specimens produced had an impact strength of between 6 and 8 foot pounds per inch of width; and they had a dull, light grey color. Pigmentability and filler dispersion were noticeably inferior to Example 1 because of the presence of the higher molecular weight polymer and because of greater spread in molecular weight.

EXAMPLE 2

A thermoplastic polymer was made from the following materials:

| | |
|---|---|
| Vinyl acetate | 740 |
| Acrylic acid | 9.1 |
| Catalyst [Bis (4-t-butyl-cyclohexyl) peroxydicarbonate] | 1.2 |

The thermoplastic polymer was made by combining the catalyst with 90 parts of the vinyl acetate to prepare a solution which was divided into 3 equal parts and stored under refrigeration. The remaining materials were charged to a reactor similar to that used in Example 1 and which was purged for 30 minutes with nitrogen. The batch was then heated to 55°C at which point one of the parts of the catalyst solution was added. Cooling water was passed through the coils of the reactor to maintain the temperature of its ingredients at 55°C plug or minus 0.5°C until the solids level of the batch reached 37.5%. The reaction was short-stopped with 0.3 parts of toluhydroquinone. After cooling, the batch was discharged and diluted with additional vinyl acetate to give a syrup containing 33.3% solids.

The polyester was prepared using the procedure of Example 1 excepting that the resin was dissolved in vinyl acetate monomer to give a polyester syrup containing 67% solids. A matrix resin mix was then made using the procedure of Example 1. A bulk molding compound was then made of the matrix resin mix using the procedure of Example 1, and the test specimens made therefrom had generally the same properties as did those of Example 1, except that the interface was more distinct. This is because polyvinylacetate, by its very nature, is less compatible with polyesters than is polystyrene.

EXAMPLE 3

A methyl methacrylate polymer was made from the following materials in parts by weight:

| Methyl methacrylate | 1482 |
| Methacrylic acid | 18 |
| Catalyst Azo bis (isobutyronitrile) | 28 |

The thermoplastic polymer was prepared by charging all the materials to the reactor described in Example 1. After 30 minutes of nitrogen purge, the content of the reactor was heated to 70°C plus or minus 0.5°C and maintained at this temperature with a flow of water through the cooling coil. The batch was short-stopped at 36% solids with toluhydroquinone; and after cooling, the contents were discharged and diluted with additional methyl methacrylate monomer to give a syrup having a solids content of 33.3%.

The polyester was prepared using the procedure of Example 1 excepting that it was diluted with methyl methacrylate instead of styrene to give a polyester syrup having 67% solids. Test specimens were prepared using the procedure of Example 1, and these specimens had generally the same properties as did those of Example 1, except that the interface was more distinct. This is because polymethyl methacrylate, by its very nature, is less compatible with polyesters than is polystyrene.

EXAMPLE 4

Sheet molding compounds are made of the following materials according to the procedure given in the Davis, Wood and Miller U.S. Pat. No. 3,615,979:

| Materials | Desirable % By Weight | Preferred % By Weight |
|---|---|---|
| Linear thermoplastic resin of low dispersity and average molecular weight | 1–20 | |
| Polystyrene of Example 1 | | 4.0 |
| Resin having crosslinkable olefinic double bonds | 20–90 | |
| Polyester of Example 1 | | 24.0 |
| Mutual solvent | 5–40 | |
| Styrene | | 20.0 |
| Catalyst for crosslinking double bonds | 0.001–5 | |
| Dicumyl peroxide | | 0.85 |
| 2-5-dimethyl hexyl-2,5 di(peroxybenzoate) | | 0.09 |
| Mold release agent | 0–5 | |
| Zinc stearate | | 1.71 |
| Gelling agent (Alkaline Earth Metal Oxide) | 0–10 | |
| Ca(OH)$_2$ | | 1.28 |
| Fillers and/or fibers | 0–75 | |
| CaCO$_3$ | | 40.0 |
| Chopped glass fibers | | 8.07 |

The sheet molding compound that was made using the preferred percentage by weight of materials given above had very good properties including high strength and there was substantially no fiber imprint in the surface of the molded article. Sheet molding compounds can be made using the desirable percentages by weight ingredients given above. The mold release agents, gelling agents, and fillers are not essential, but are usually used in sheet molding compounds for the well known functions which they perform. The fillers cheapen the product and provide coloration, and the fibers strengthen the product. A combination of fillers and fibers is usually used to provide optimum strength at a minimum cost. The upper percentage of the ranges given above for the crosslinking resin is the maximum percentage used in resin mixes that are devoid of fillers and fibers. The lowest percentage of the range given is that used when fillers and/or fibers are utilized. The same is true for the percentage ranges given for the thermoplastic resin, and the mutual solvent.

In order to determine the reasons for the improved properties of the materials of the present invention, a study of the morphology of the materials was made. The photomicrographs of the materials described in Examples 1, 2, and 3 are similar; and photomicrographs of the materials of Example 1 are given as exemplary. The matrix forming resin syrup of Example 1 was used in the neat form, and was cured under positive pressure at 400 psi and 250°F in a press. The cured resin was cut into strips approximately ½ inch wide and these strips were then broken in half to reveal the internal structure. A photomicrograph was made of a portion of the surface of the fracture at a magnification of 450 using a scanning electron microscope. A copy of the photomicrograph is given in FIG. 1 of the drawings, and the morphology thereof will now be described.

Figure 2:
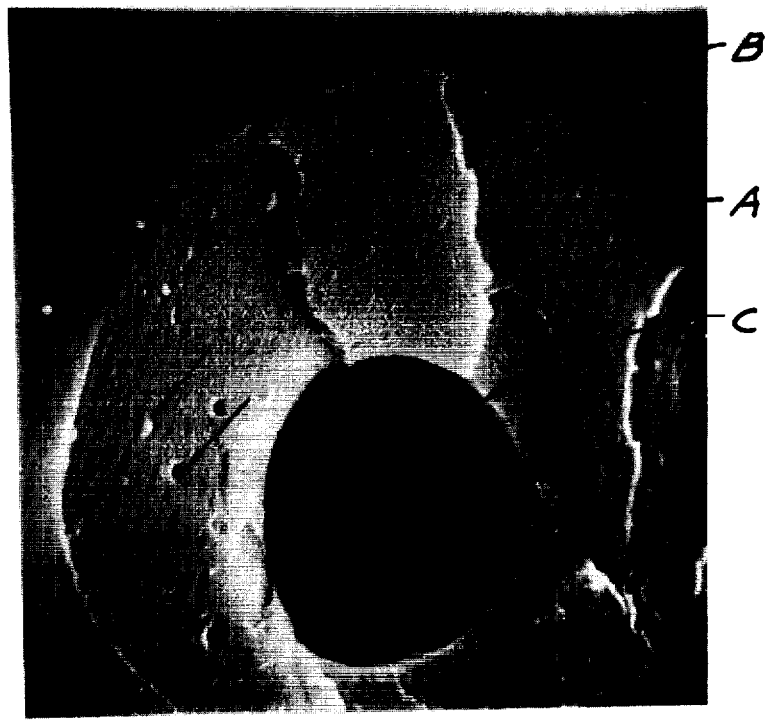
FIG. 2 is a photomicrograph of a portion of the material shown in FIG. 1 but made at a magnification of 1800.

The photomicrographs of FIGS. 1 and 2 show a matrix (designated B) of the polyester material having irregularly shaped pockets therein (designated A) of the thermoplastic material and which were broken in generally the same plane as was the matrix resin when the test specimen was fractured. The fact that the fracture extended across the separated thermoplastic phase A demonstrates that the thermoplastic phase A was tightly bonded to the matrix material B. Observation of the fracture of the test specimens shows that this is typical, and that there are no voids between the thermoplastic phase A and the matrix B. Further observation of the fracture of the test specimens shows that a sizable number of the thermoplastic bodies A have a void in the center thereof as shown in the upper middle of FIG. 1. The upper middle portion of the area shown in FIG. 1 was enlarged at a magnification of 1800, and a copy of this photomicrograph is shown in FIG. 2 of the drawings.

FIG. 2 of the drawings clearly shows the void designated C within the center of the thermoplastic body A. FIG. 2 further indicates still other phases designated by the parallel arrows to be present within the major thermoplastic phase A. These other major phases are minute and are believed inconsequential in producing the improved properties of the present invention. On the other hand, the fact that these other phases are maintained at such a minor particle size and amount is believed beneficial relative to the improved properties of the present invention.

Figure 3:
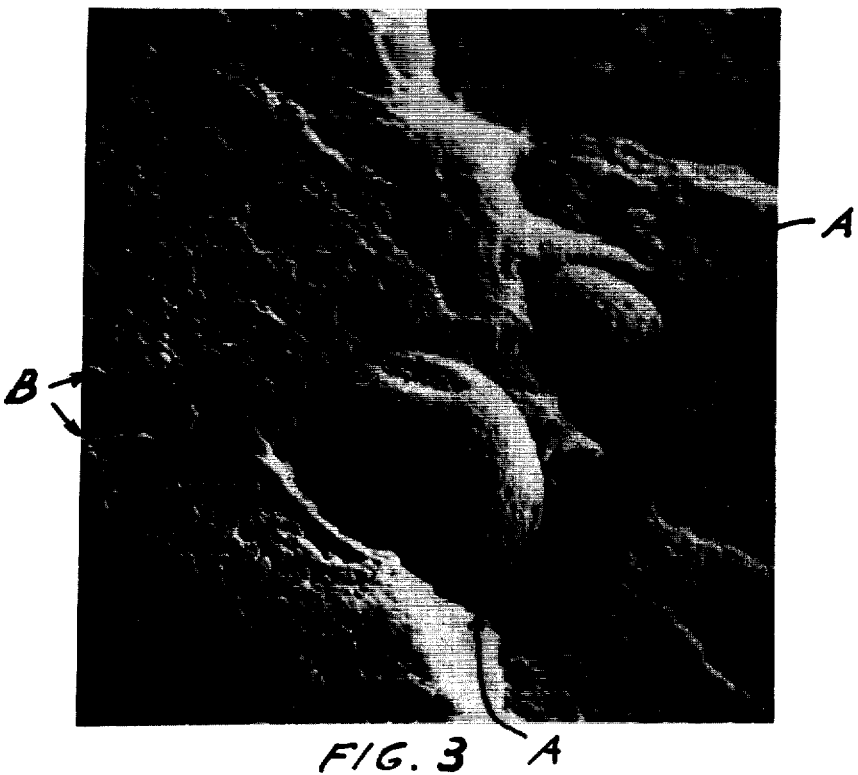
FIG. 3 is photomicrograph of a prior art material not according to the present invention, and which was made by an electron microscope at a magnification of 2200.
Figure 4:
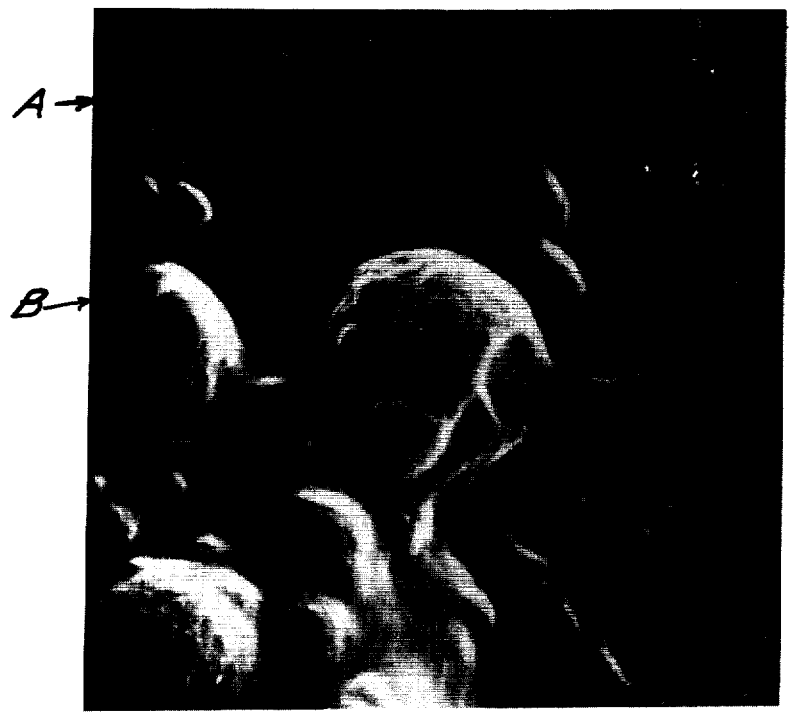
FIG. 4 is a photomicrograph of a portion of the material shown in FIG. 3 but at a magnification of 22,000.

In order to exemplify the difference in the morphology between the materials of the present invention and the best prior art as represented by its most recent development described in the Kroekel U.S. Pat. No. 3,701,748, photomicrographs were made of a material prepared in accordance with Example 1 of the Kroekel patent. A matrix resin syrup prepared in accordance with Example 1 of that patent and containing 37.5 parts of unsaturated polyester, 12.5 parts of the methyl methacrylate thermoplastic polymer, and 50 parts of styrene was cured in the neat form using 1% t-butylperoctoate under a positive pressure of 400 psi and 250°F in a press. A test specimen was prepared as above described and broken in half. a photomicrograph was made of the fracture at a magnification of 2,200 using a scanning electron microscope. A copy of this photomicrograph appears in the drawings hereof as FIG. 3. In FIG. 3 of the drawings the separated thermoplastic phase is designated by the arrow A. This area of the fracture was selected because there also appears a fracture of one of the bodies A as designated by the arrow B. FIG. 3 clearly shows that the fracture for the most part passes around and along the interface between the major separated thermoplastic phase A and the matrix. The major bodies A, as shown at B, comprise a plurality of smaller thermoplastic particles which are knit together but which do not constitute a homogeneous phase. This fact is further shown by FIG. 4 of the drawings which is a photomicrograph at a magnification of 22,000 and which was made by a scanning electron microscope of the area B shown in FIG. 3. FIG. 4 shows a smaller dispersed phase in the form of particles B surrounded by a matrix of the thermoplastic resin designated A.

In general, the materials of the present invention have an interface between the major separated thermoplastic phase and the matrix which is much more diffuse than occurs in prior art materials. This fact indicates that the materials of the present invention have a much better bond between the matrix and the separated thermoplastic phase. The better bonding produced by the present invention is believed to cut down the opacity of the materials by reason of a reduction in the scattering of transmitted light as it passes across the interface between the matrix and the separated phase and to reduce clumping or aggregation of pigment. Because there is less light scattering and more even distribution of pigment in the materials of the present invention, the pigments therein are more observable, and the products have deeper coloration.

From the above description and photomicrographs it will now be apparent that the improved properties of the materials of the present invention are had by reason of a more diffused bond between the major thermoplastic separated phase and the polyester matrix resin, and a generally more homogeneous matrix. It is further apparent that the more diffused bond between the thermoplastic separated phase and the matrix resin is had by the use of a thermoplastic polymer the molecules of which are all of about the same intermediate molecular weight so as to still have some compatibility with polyester prepolymer and be moderately soluble in its monomer. A sizable percent of the monomer is carried with the thermoplastic molecules as they leave the polyester during its cure. Because the thermoplastic molecules are of a controlled low to intermediate molecular weight they have some affinity for the polyester when agglomerated to bond tightly to the crosslinked polyester. Because the molecules are all of about the same molecular weight (low dispersity), all molecules start to leave the polyester at about the same time during its cure; and because they all are of a low to intermediate molecular weight, they have a high degree of affinity for the monomer and carry along more than can be polymerized during molding. Because the thermoplastic molecules still have some affinity for the cured polyester, the agglomerated thermoplastic molecules plate out at the interface leaving the excess monomer at the center of the agglomerated bodies.

Upon release of the molding pressure, the monomer vaporizes to expand and form the voids that are evident at the center of the agglomerate bodies. It is apparent that such a morphology can only be had by a particular narrow band molecular weight of the thermoplastic resin.

Experience has shown that the thermoplastic resins should be of a narrow band of molecular weight having an average molecular weight between 75,000 and 500,000, preferably between 175,000 and 250,000, and most preferably at about 200,000. The dispersity should be between 1.0 and 3.5; and should preferably be between 1.0 and 2.6. In order to give the low porosity and absence of blistering of the invention, the thermoplastic should have less than 0.10% by weight of monreactive solvents present, and preferably less than 0.05%.

In order to give the improved surface brightness and gloss, there should be less than 0.5% by weight of emulsifiers and colloidal solvents, and preferably less than 0.2%.

The thermoplastics of the invention also produce less pregelation and give improved uniform viscosity of the molding compound. This is believed to be due in part to the low moisture content of the thermoplastic as is achieved by keeping the thermoplastic in its own monomer throughout its formation and use. The moisture content should be less than 0.20% by weight, and should preferably be less than 0.10%.

In order to obtain the desired narrow band of molecular weight, the polymerization is preferably carried out at a temperature between 40°C and 90°C, and should be stopped before reaching 50% conversion. Preferably a low activity-free radical catalyst is used having a dissociation constant at 75°C of between $8 \times 10^{-6}$ and $5 \times 10^{-5}$ moles per mol per second in order that the intermediate length molecules are grown (neither too low molecular weight nor too high). Without producing an encyclopedia of materials, a partial list of the initiators will include: Benzoyl peroxide, Azo bis (isobutyronitrile), t-Butyl perpivolate, Bis (4-butylcyclohexyl) peroxydicarbonate, 2,2' azo-bis-2-methylbutyronitrile, 2,2' azo-bis-2-cyclopentylpropionitrile, 4-chlorobenzoyl peroxide. The reaction must be stopped before 50% conversion is reached to prevent a broad range (large dispersity) of molecular weight material from being formed, and to prevent appreciable branching of the molecules from taking place. The use of the inhibitor to stop the reaction before 50% conversion is reached also aids in preventing high molecular weight molecules from being formed. Without producing an encyclopedia of these materials, a partial list of the inhibitors will include: Toluhydroquinone, hydroquinone, Methyl ether of hydroquinone, m-dinitro benzene, chlorobenzoquinone, diphenylamine, etc..

It will further be apparent that the resin system can include any matrix resin that is crosslinked by reason of the condensation of olefinic double bonds, along with any thermoplastic polymer that is made from the condensation of olefinic double bonds, and both of which are soluble in a mutual solvent system. Preferred thermoplastics are those made by a polymerization of the mutual solvent. Crosslinking polyester resins are a preferred matrix forming resin prepolymer, and preferred monomers are those having at least one polymerizable reactive $CH_2=C<$ group. A partial list of suitable thermoplastic polymers and suitable monomers are given in the Kroekel U.S. Pat. No. 3,701,748. In the preferred embodiments, the thermoplastic polymer, preferably a styrene copolymer is produced to less than 50% conversion, and kept mixed with the monomer from which it is made.

Experience seems to indicate that polymer molecules which are kept in the monomer in which they are made, stay individually dispersed and surrounded by monomer solvent molecules better than do polymer molecules which have been concentrated to a solid which is then dissolved in the solvent. Where the solid polymer has been dissolved, it is believed that many polymer molecules stay together as a group with the group then solvated by the solvent monomer. Such grouped polymer molecules do not separate from the polyester at the same time that individually solvated molecules do. Solid thermoplastic polymers which have been redissolved therefore are not to be preferred.

While the polymerization reaction of the monomer can be stopped before completion and at substantially any percent solids, preferred syrups are had when the reaction is from 20 to 50% complete. The reaction is preferably stopped with an inhibitor which stays with the thermoplastic and is added therewith to the thermosetting prepolymers where it delays its further polymerization until the final stages of the crosslinking of the matrix resin.

While the invention has been described in considerable detail, we do not wish to be limited to the particular embodiments shown and described, and it is our intention to cover hereby all novel adaptations, modifications, and arrangements thereof which come within the practice of those skilled in the art, and which are covered by the appended claims.

We claim:

1. In the process of producing low-shrink thermosetting polyester molding compounds wherein an unsaturated thermosetting polyester prepolymer, an unsaturated solvent therefor, and a minor amount of a thermoplastic polymer that is also miscible in said solvent is mixed therewith, the improvement comprising: initiating polymerization of an unsaturated monomer composed principally of styrene at a temperature between 40°C and 90°C to produce a non-highly branched thermoplastic polymer, stopping the polymerization reaction when less than 50% of the monomer has reacted to give a polystyrene having a narrow band of intermediate molecular weight between approximately 75,000 and approximately 500,000 and having a dispersity between 1.0 and 2.6, maintaining said polystyrene dispersed in the styrene as a solution thereof, and mixing the solution of said polystyrene and styrene with the thermosetting polyester prepolymer to form a hardenable mixture, and whereby the hardenable mixture during cure forms nonspherical thermoplastic bodies of a separated phase having a diffuse interface tightly bonded with the cured thermoset resin.

2. The process of claim 1 wherein said initiating step is performed with the aid of a free radical catalyst having a dissociation constant between $8 \times 10^{-6}$ to $5 \times 10^{-5}$ at 75°C.

3. The process of claim 1 wherein the stopping of the polymerization step is accomplished at least in part by an inhibitor.

4. In the process of producing low-shrink thermosetting polyester molding compounds wherein an unsaturated thermosetting polyester prepolymer, an unsaturated solvent therefor, and a minor amount of a thermoplastic polymer that is also miscible in said solvent is mixed therewith, the improvement comprising: initiating polymerization of an unsaturated monomer composed principally of styrene at a temperature between 40° and 90°C and with a free radical catalyst having a dissociation constant between $8 \times 10^{-6}$ and $5 \times 10^{-5}$ at 75°C to produce a non-highly branched thermoplastic polystyrene polymer or copolymer, stopping the polymerization reaction when less than 50% of the monomer has reacted to give a thermoplastic polymer of a narrow band of intermediate molecular weight between approximately 175,000 and approximately 250,000 and having a dispersity between 1.0 and 2.6, maintaining the thermoplastic polymer dispersed in the monomer as a solution thereof, mixing the solution with the thermosetting polyester prepolymer to form a hardenable mixture, and reacting said solvent with said thermosetting polyester prepolymer to crosslink the prepolymer and liberate bodies of said thermoplastic polymer therein which have a diffuse interface tightly bonded with the crosslinked polymer.

5. The process of claim 4 wherein said polymerization step is carried out until from between 20 and 50% of the unsaturated monomer has been converted to a thermoplastic polymer.

6. The process of claim 5 wherein said polymerization step is started with a free radical catalyst and is stopped by the addition of an inhibitor.

7. The process of claim 6 wherein the stopping of the polymerization step is accomplished with a toluhydroquinone addition.

8. In the process of producing low-shrink thermosetting molding compounds wherein an unsaturated thermosetting polyester prepolymer, an unsaturated solvent therefor, and a minor amount of a thermoplastic polymer that is also miscible in said solvent is mixed therewith, the improvement comprising: initiating polymerization of a styrene containing monomer at a temperature between 40° and 90°C and with a free radical catalyst having a dissociation constant between $8 \times 10^{-6}$ and $5 \times 10^{-5}$ at 75°C to produce a non-highly branched polystyrene, stopping the polymerization reaction when less than 50% of the monomer has reacted to give a thermoplastic polymer of a narrow band of intermediate molecular weight between approximately 75,000 and 500,000 and having a dispersity between 1.0 and 2.6 with an inhibitor, maintaining the thermoplastic polymer dispersed in the monomer as a solution thereof, mixing the solution with the thermosetting polyester prepolymer to form a hardenable mixture, and reacting styrene with said thermosetting polyester prepolymer to crosslink the prepolymer and liberate bodies of said polystyrene therein which have a diffuse interface with the crosslinked polymer.

9. In a molding compound of the type comprising an unsaturated thermosetting polyester prepolymer, an unsaturated crosslinking solvent therefor, and a minor amount of a thermoplastic polymer that is also miscible in said solvent, the improvement wherein said thermoplastic polymer is a polystyrene consisting of a narrow band of intermediate molecular weight polymer molecules having a dispersity between 1.0 and 2.6 and an average molecular weight between 75,000 and 500,000.

10. The molding compound of claim 9 wherein said thermoplastic polymer is dissolved in unsaturated solvent containing less than 0.10% by weight of unreactive solvent, 0.5% by weight of emulsifiers and 0.2% of moisture.

11. The molding compound of claim 10 wherein said prepolymer is an unsaturated polyester prepolymer, said unsaturated solvent is styrene, and said thermoplastic polymer is a polystyrene.

12. The molding compound of claim 11 wherein said thermoplastic polymer is deactivated by toluhydroquinone.

13. The molding compound of claim 9 wherein said prepolymer is a crosslinking polyester prepolymer.

14. A molding compound comprising the following materials in percent by weight:

| | |
|---|---|
| Thermoplastic polystyrene resin | 1 to 20 |
| Polyester resin having crosslinkable olefinic double bonds | 20 to 90 |
| Mutual styrene solvent | 5 to 40 |
| Free radical catalyst | 0.001 to 5 |
| Mold release agent | 0 to 5 |
| Gelling agent | 0 to 10 |
| Fillers and/or glass fiber reinforcements | 0 to 75 | said polystyrene resin being an essentially linear polymer consisting of a narrow band of intermediate molecular weight polymer molecules having a dispersity between 1.0 and 2.6 and an average molecular weight between 75,000 and 500,000, and whereby said thermoplastic resin separates from said crosslinking resin during its cure to produce bodies having a diffuse interface with the crosslinking resin.

15. The molding compound of claim 14 wherein said mutual solvent is predominantly unsaturated molecules containing less than 0.10% by weight of saturated molecules, and said thermoplastic resin contains less than 0.5% by weight of emulsifiers and less than 0.2% by weight of water.

16. The molding compound of claim 15 wherein the polymerized thermoplastic resin has been deactivated by a free radical inhibitor.

17. The molding compound of claim 16 wherein the thermoplastic resin was deactivated by toluhydroquinone.

18. The molding compound of claim 14 wherein the polystyrene is deactivated by a free radical inhibitor.

19. The molding compound of claim 18 wherein the inhibitor is toluhydroquinone.

20. The molding compound of claim 14 containing glass fibers as a reinforcement.

* * * * *